Feb. 24, 1970  G. M. FULMER ET AL  3,497,231
DEMOUNTABLE RUNNING GEAR WITH ARTICULATED REAR AXLE
Filed Nov. 23, 1966  4 Sheets-Sheet 2
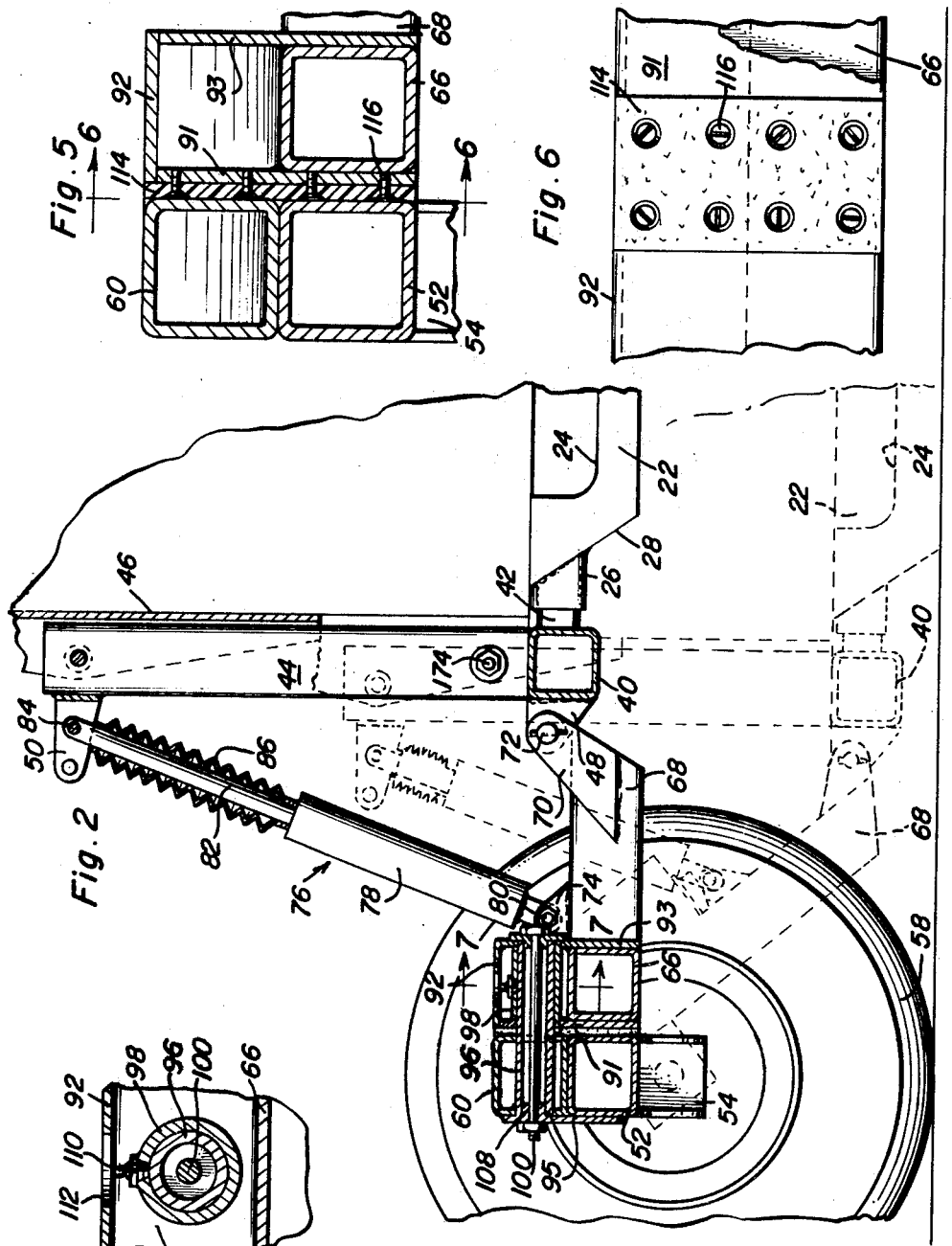
George M. Fulmer
Frank B. Lane
INVENTORS

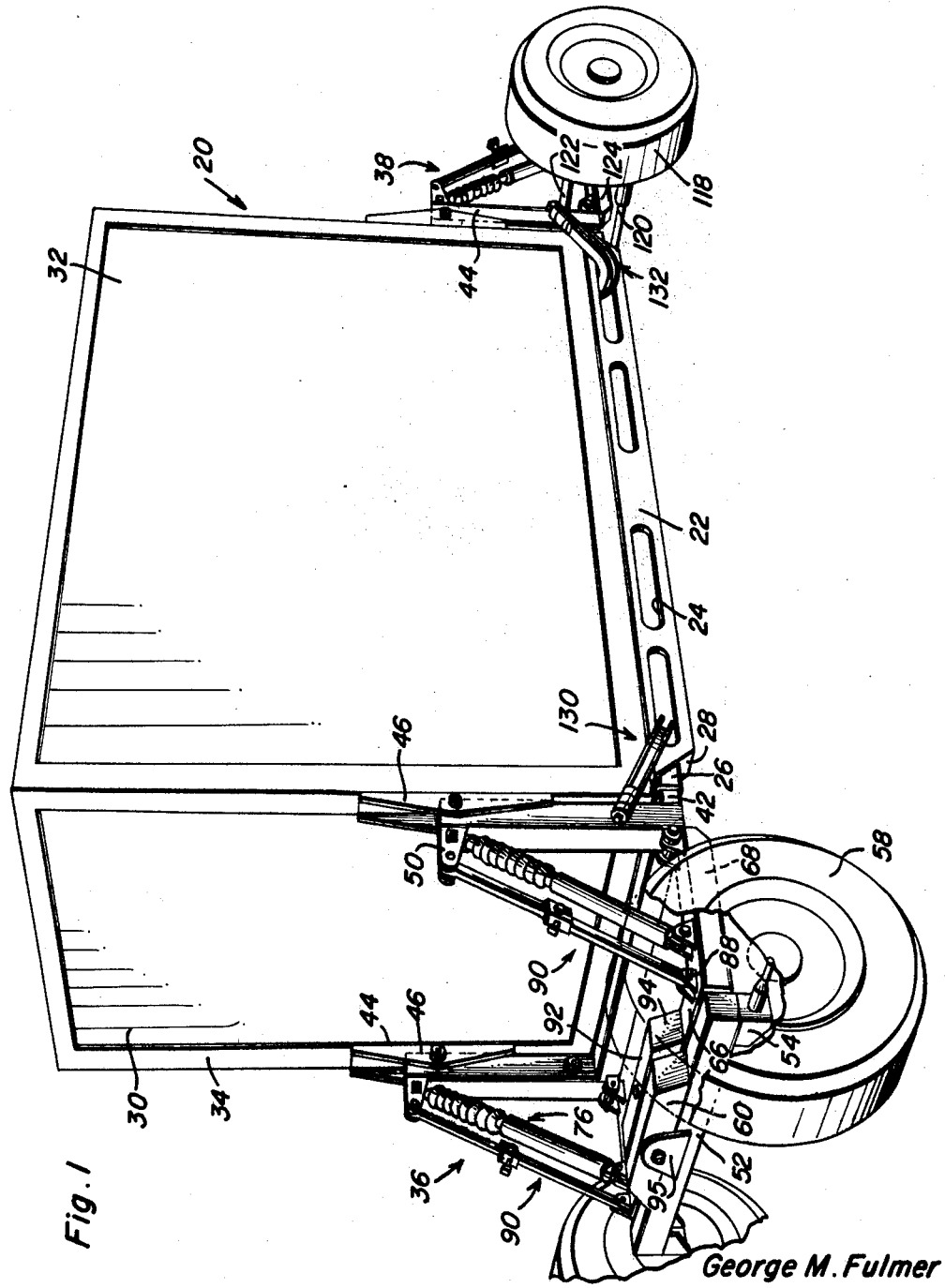

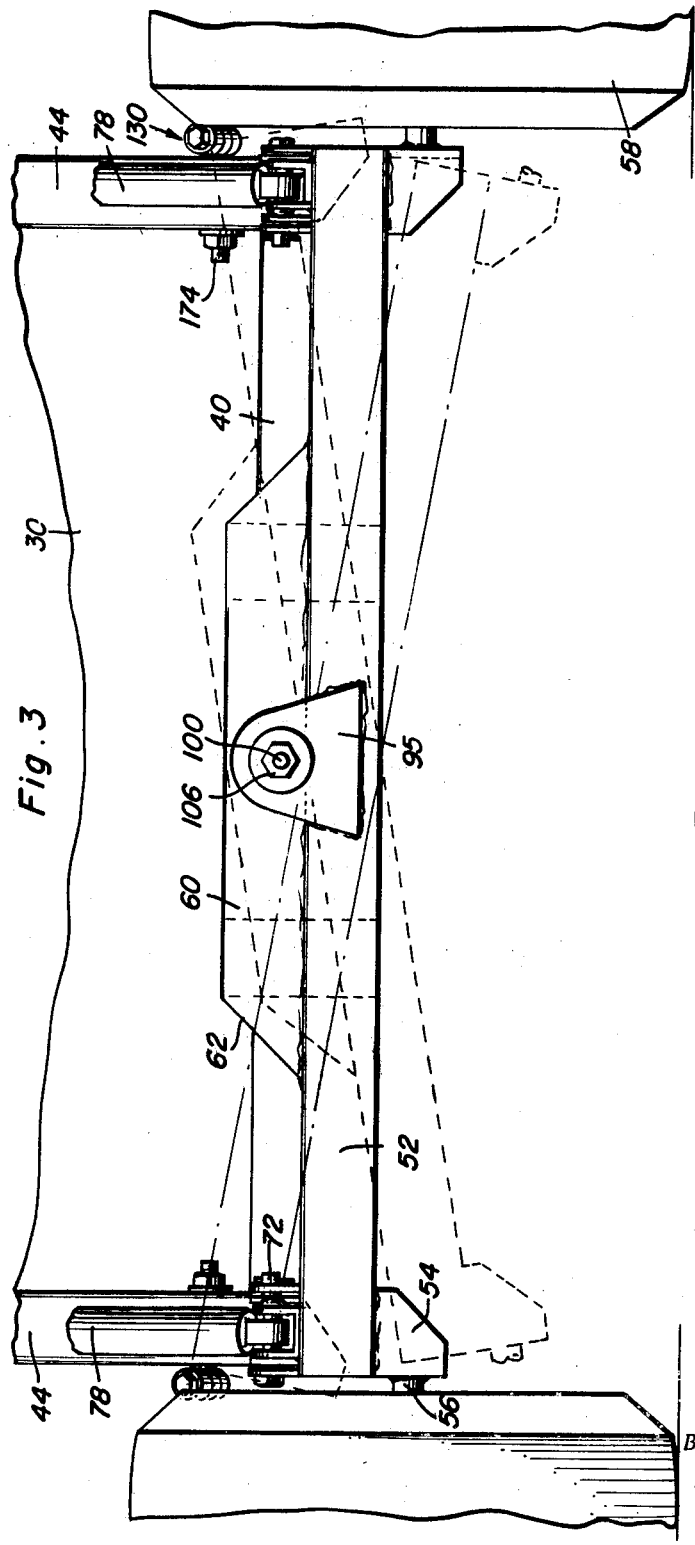
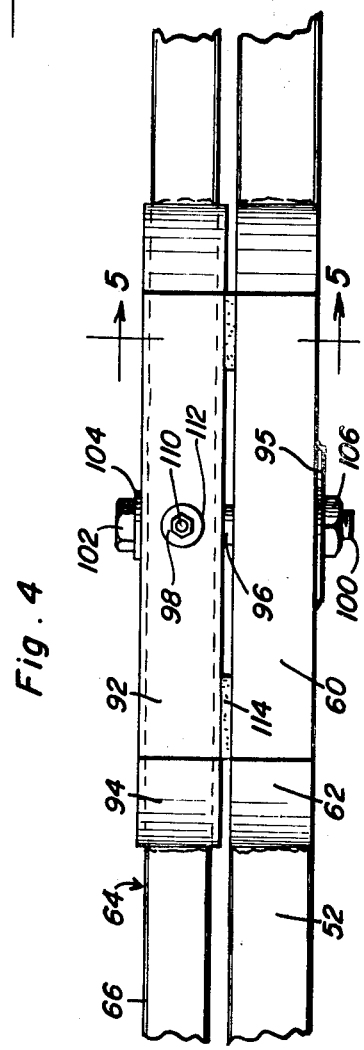
George M. Fulmer
Frank B. Lane
INVENTORS

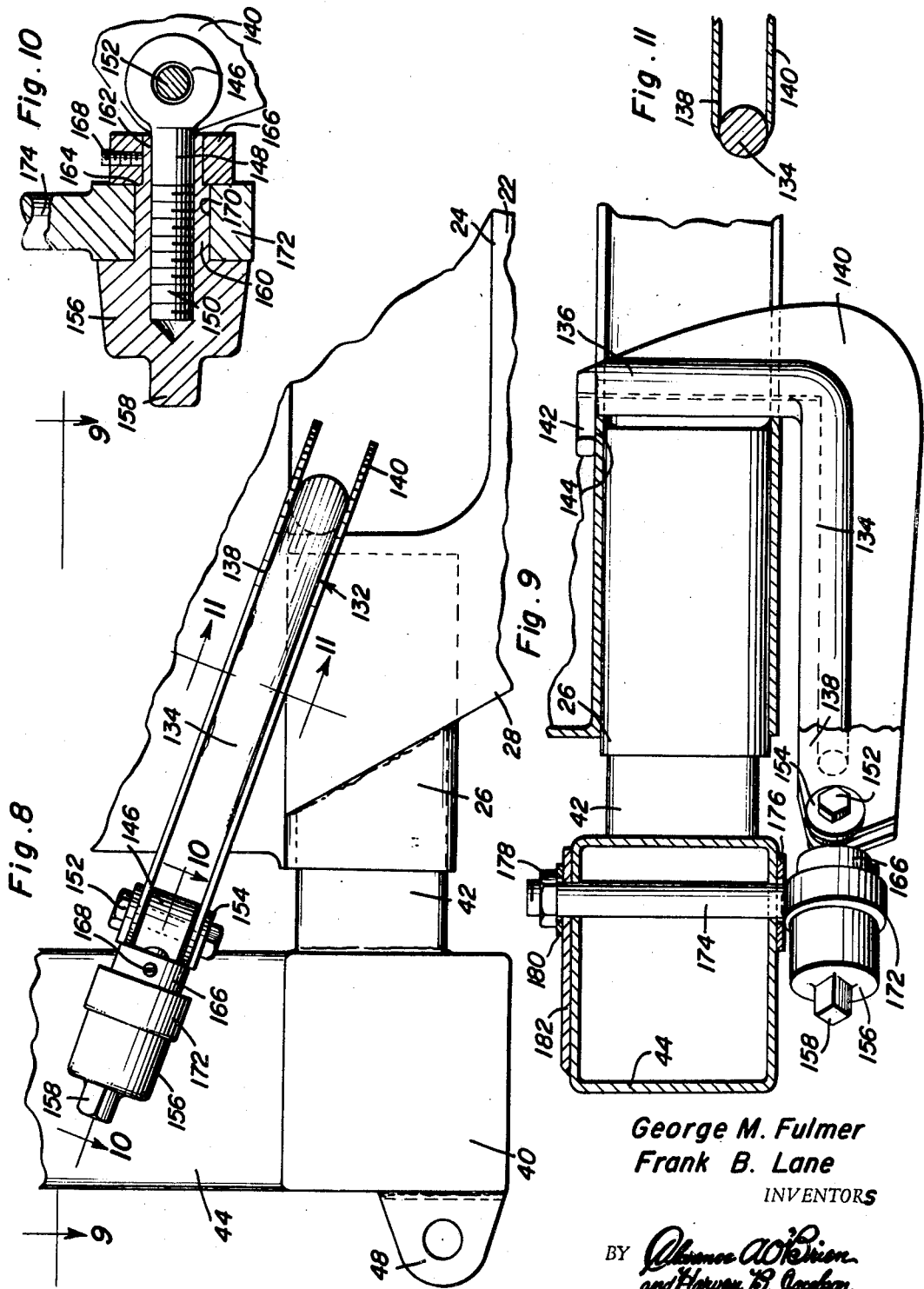

United States Patent Office 3,497,231
Patented Feb. 24, 1970

1

3,497,231
DEMOUNTABLE RUNNING GEAR WITH ARTICULATED REAR AXLE
George M. Fulmer, Silver Spring, and Frank B. Lane, Annapolis, Md., assignors to Gichner Mobile Systems, Inc., a corporation of Maryland
Filed Nov. 23, 1966, Ser. No. 596,566
Int. Cl. B60p 3/00
U.S. Cl. 280—35                                 14 Claims

ABSTRACT OF THE DISCLOSURE

A running gear detachably connected to a load which is capable of elevating the load from a supporting surface and transporting the load to another location by employing a towing vehicle. The running gear attached to the rear of the load is provided with a rigid axle which is pivotally supported from an attachment assembly connected to the load to enable free and unrestricted rotational movement about substantially a longitudinal axis. The running gear also includes a hook-type connecting device for connecting the attachment assembly of the running gear to the load.

---

This invention generally relates to a demountable running gear for attachment to a body unit such as a shelter enclosure, a load carrying body or the like and more particularly represents various improvements in that construction illustrated in prior Patent Nos. 2,968,490, issued Jan. 17, 1961, for Demountable Running Gear and 3,243,193, issued Mar. 29, 1966, for Hydraulically Operated Demountable Running Gear, and 3,378,276, issued Apr. 16, 1968, for Hydraulically Operated Demountable Running Gear With Diagonal Rams, which patents are assigned to a common assignee with this application.

An object of the present invention is to provide a demountable running gear for a load carrying body or shelter unit of substantially rigid construction with the rear running gear having a transversely extending rigid axle that is pivotally supported from an attaching assembly to enable free pivotal movement or rotatable movement of the transversely extending axle about a longitudinal axis paralleling the path of movement to enable movement of the axle and wheel assembly at each end thereof to follow variations in the terrain being traversed without correspondingly tilting the load carrying body or shelter.

Another object of the present invention is to provide a demountable running gear for a load carrying body or shelter unit which includes a novel hook-type connecting assembly between the demountable running gear and the load carrying body or shelter unit to enable quick and easy connection and disconnection therebetween with the connection being positive and secure and being accomplished without requiring the use of fastener bolts or the like connected to the load carrying body or shelter unit.

A further object of the present invention is to provide a running gear in accordance with the preceding objects having an articulately connected axle on at least one of the running gears together with novel means for positively connecting the running gear to a load carrying body or shelter unit at the lower edge thereof thus eliminating the detachable connection between the load carrying body or shelter unit and the upwardly extending assembly which exerts a lateral force on the load carrying body or shelter unit as it is being elevated by a fluid pressure operated ram.

Still a further object of the present invention is to provide a running gear with an articulated axle assembly and a positive hook-type connecting means with the load carrying body or shelter unit which is relatively simple in construction, easy to assemble and disassemble in relation to the load carrying body or shelter unit, positive in its connection with the load carrying body or shelter unit, long lasting and durable and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a rear perspective view of the demountable running gear of the present invention associated with a load carrying body or shelter unit;

FIGURE 2 is a sectional view of the rear running gear assembly taken generally along the longitudinal center line thereof illustrating the pivotal connection between the rear axle and the rear attaching assembly;

FIGURE 3 is a rear elevational view of the rear running gear illustrating the pivotal rear axle and the movement thereof which may occur about the longitudinal axis of the interconnecting pivot bolt;

FIGURE 4 is a top plan view of the pivot bolt and the connection with the rear axle and rear attaching assembly;

FIGURE 5 is a transverse, sectional view taken substantially upon a plane passing along section line 5—5 of FIGURE 4 illustrating the construction of the rub strips between the relatively movable components of the rear axle and the attaching assembly;

FIGURE 6 is a detailed elevational view taken along reference line 6—6 of FIGURE 5 illustrating further structure of the rub strips;

FIGURE 7 is a detailed sectional view taken substantially upon a plane passing along section line 7—7 of FIGURE 2 illustrating the structure of the pivot connection for connecting the pivotal axle to the lower attaching assembly;

FIGURE 8 is an enlarged side elevational view of the hook-type connection between the running gear and the load carrying body or shelter unit;

FIGURE 9 is a plan sectional view taken substantially upon a plane passing along section line 9—9 of FIGURE 8 illustrating the structural details of the hook-type connecting means;

FIGURE 10 is a detailed sectional view taken substantially upon a plane passing along section line 10—10 of FIGURE 8 illustrating the supporting connection of the hook-type attachment to the attaching assembly; and FIGURE 11 is a detailed sectional view taken substantially upon a plane passing along section line 11—11 of FIGURE 8 illustrating further details of the construction of the hook-type connecting means.

Referring now specifically to the drawings, the load carrying body of the present invention is generally designated by the numeral 20 and this may be in the form of any type load unit such as a shelter unit or the like having a bottom frame structure 22 which may be an integral part of the load unit or may be in the form of a separate pallet or the like. Specifically, the frame unit 22 includes longitudinal slot-like openings 24 spaced longitudinally therein to provide access openings and also to provide lightness of weight. In each end of each bottom frame member 22, there is provided a longitudinally and outwardly opening socket 26 which may be welded or otherwise fixed to the inclined end 28 of the bottom frame member 22. The bottom frame members 22 may be disposed along each side of the load carrying body or there may be a plurality of longitudinally disposed bottom frame members 22 with each frame member preferably being in the form of a hollow box frame member having the slots 24 at least in the outer sides thereof. In addition to this, the load carrying body 20 includes end walls 30 and side walls 32 with a peripheral frame 34 being provided as desired. The specific structure of the load carrying body or shelter unit is conventional with the frame members 22 being provided with the sockets 26 at each end thereof for enabling a rear running gear 36 and a front running gear 38 to be connected therewith in a manner described hereinafter.

The rear running gear 36 is provided with a transversely extending tubular member 40 oriented along the bottom edge of the load carrying body 20 and the surface thereof facing the sockets 26 is provided with a pair of rigid laterally extending tubular projections 42 which are adapted to fit telescopically within the sockets 26 with the external dimensions of the projections or lugs 42 being only slightly less than the internal dimensions of the sockets 26. Projecting upwardly from each end of the tubular member is an upstanding tubular member 44 in the form of a pylon or arm that is rigid with the transverse tubular member 40 and which extends upwardly alongside of the end wall 30 with a pad 46 being provided at the upper end thereof for orientation between the upper end of the upstanding pylon 44 and the load carrying body 20. The pad 46 is an elongated channel shaped member pivoted to the pylon 44 by a pivot pin 47 and provides means for distributing the lateral force exerted on the load carrying body 20 from the upstanding pylon or arm 44 over a relatively large area thereof so as not to damage surface of the body 20.

Projecting rearwardly from the lower end of the pylon 44 at each end of the transverse member 40 is a pair of laterally extending pivot lugs 48 that are rigid with the pylons 44 and transverse member 40. Projecting laterally from the upper end of each pylon 44 is a pair of spaced pivot lugs 50 which may be in the form of the legs of a U-shaped member welded to the upper end portion of the pylon or arm 44.

The rear running gear 36 also includes a rigid transversely extending rear axle 52 which is in the form of a hollow box frame member having downwardly depending spindle brackets 54 at each end thereof supporting spindles 56 for rotatably supporting the rear wheels 58 in a conventional manner.

Centrally of the rear axle 52 and disposed on the top surface thereof is a transverse reinforcing frame member 60 which is shorter than the axle 52 but of the same box frame configuration with the ends of the frame member 60 being downwardly and outwardly inclined as at 62.

Disposed between the rear axle 52 and the transverse member 40 is a generally U-shaped attaching frame generally designated by the numeral 64 and which includes a transversely extending tubular frame member 66 of the same box shaped configuration as the axle and being oriented substantially in alignment with the axle 52 as illustrated in FIGURE 2. Extending rigidly from the ends of the transverse frame member 66 and forming the legs of the U-shaped member 64 is a pair of rigid arms 68 also of hollow box frame construction with the free ends thereof having longitudinally and upwardly extending lugs 70 rigid therewith for association with the lugs 48 and for receiving a removable pivot pin or bolt 72 thus pivotally connecting the arms 68 to the transverse member 40 and upwardly extending pylons or arms 44.

The upper surface of each of the arms 68 is also provided with a pair of lugs 74 spaced from the lugs 70 for pivotal connection with a fluid pressure operated piston and cylinder assembly 76 which is in the form of a hydraulic ram having the cylinder 78 pivotally connected to the lugs 74 by a pivot bolt 80 and the piston rod 82 pivotally connected to the lugs 50 by a pivot pin or bolt 84. A protective bellows-type flexible casing 86 is provided for the piston rod 80 with the ram being either single or double acting and being the same as disclosed in the previously mentioned prior patents and copending application.

Outwardly from the lugs 74, a second set of lugs 88 to which is pivotally connected the lower end of a lock brace structure generally designated by the numeral 90 which has the upper end thereof pivotally connected to the outer ends of the lugs 50 as illustrated in FIGURE 1. The specific construction of the lock brace 90 is also illustrated in the previously mentioned prior patents and copending application.

By engaging the projections or lugs 42 with the sockets 26 activating the hook-type connecting mechanism 130 and then extending and retracting the piston and cylinder assembly 76, the load carrying body 20 may be elevated or lowered as illustrated in FIGURE 2 with the lock brace 90 being employed to lock the load carrying body in elevated position for over-the-road movement.

An articulate connection is provided between the transversely extending rigid axle 52 and the transversely extending rigid frame member 66 and this is provided by the employment of a reinforcing box frame member 92 provided on the upper surface of the transverse frame member 66 and which includes parallel plates 91 and 93 which extend down to the bottom of the frame member 66. The plates 91 and 93 and the member 92 are closed by inclined end walls 94. The outer surface of the axle 52 and the outer surface of the box frame member 60 is provided with a reinforcing plate 95. As illustrated in FIGURE 5, the reinforcing member 92 and the side plates thereof extending downwardly alongside of the side walls of the transverse frame member 66 further rigidify the structure of the transverse frame member 66.

Rigidly attached to the frame member 60 and extending therethrough is a tubular support member 96 which is rigidly affixed to and passes through both walls of the box frame member 60 and which extends through both plates 91 and 93 of the box frame 92. Disposed in the box frame 92 is a cylindrical sleeve or bushing 98 which is rigid with both walls of the box frame 92 and closely encircles the tubular member 96 thus journaling the tubular member 96 in relation to the bushing 98 to provide an articulate connection between the transverse frame member 66 and the axle 52. A through bolt 100 having a headed inner end 102 with a washer 104 which has an offset central portion telescopically received within the inner end of the tubular member 96 for rigidifying the tubular member and engaging the inner wall of the frame member 92, the end of the bushing 98 and the end of the tubular member 96 as illustrated in FIGURE 2. The other end of the bolt 100 is provided with a retaining nut 106 which engages the plate 95 with the plate 95 also having a central offset area 108 telescoped into the outer end of the tubular member 96 to further rigidify the tubular member.

A lubrication fitting 110 is provided in the top of the bushing 98 and this fitting is accessible through an access opening 112 in the top wall of the transverse box frame member 92 as illustrated in FIGURE 7.

At spaced points in relation to the through bolt 100, the inner wall of the box frame 92 is provided with vertically disposed rub strips 114 which are secured thereto by countersunk fasteners 116. The rub strip is of rigid material preferably non-metallic such as "Micarta." The rub strip 114 extends throughout the vertical length of the inner wall of the box frame 92 from the top edge thereof to the bottom edge of the transverse frame member 66 as illustrated in FIGURES 5 and 6 to provide stability and guidingly retain the axle 52 and transverse frame member 66 in parallel vertical planes. The tubular member 96 which is rigid with the axle 52 and transverses frame 60 forms the pivotal supporting connection with the bushing 98, frame member 92 and transverse member 66 and the tubular member 96 will be of high strength steel. Orientation of the tubular member 96 above the horizontal plane of the axle 52 and the transverse supporting frame member 66 will provide support for the frame member 66 generally in the nature of a pendulum type support in that the transverse frame member 66 will be normally urged towards a horizontal position due to the force of gravity regardless of the variation in the inclination or tilting of the axle 52 as the wheels 58 traverse uneven terrain with the pivotal movement of the axle 52 being illustrated by dotted line in FIGURE 3.

The front running gear 38 is the same as the rear running gear 36 except for the articulated axle construction and the use of steerable front wheels 118 with a suitable steering control mechanism 120. With this construction, the front axle 122 has the arms 124 rigidly fixed thereto with the arms 124 being connected to the upstanding pylons 44 in the same manner as in the rear running gear. Thus, in effect, the arms 124 are merely welded to the axle 122 and the manner of connecting the pylons 44 to the load carrying body 20 is the same as in the rear running gear and this is also true of the hydraulic ram mechanism and the lock brace mechanism.

FIGURES 8-11 illustrate in more detail, the hook-type connecting mechanism generally designated by the numeral 130 for connecting the pylons 44 to the frame member 22 and retaining the projections or lugs 42 telescoped into the sockets 26.

The connecting means 130 includes a hook-like member generally designated by the numeral 132 including an elongated rod 134 having the free end thereof extending laterally at 136. L-shaped plates 138 and 140 are attached to the upper and lower surface of the rod 134. The terminal end of the laterally extending portion 136 of the rod 134 is provided with a lug or toe 142 which is welded to the end of the laterally extending portion of the rod and projects inwardly therefrom to define a retaining surface 144. The plates 138 and 140 may also be welded to the top and bottom edges of the lug or toe 142. Thus, when the hook-shaped member 132 is inserted into one of the slot-like openings 24 in the side frame member 22, it will be retained in position therein and prevented from slipping out by the lug or toe 142. Inasmuch as the side frame member 22 is in the form of a box frame and the slot-like openings 24 may be formed in both walls thereof, the distance between the inner surface 144 of the lug or toe 142 and the corresponding inner surface of the rod 134 may be substantially the same as the width of the frame member 22 for retaining the rod 134 generally in parallel relation to the side surface of the bottom frame member 22.

The top and bottom plates 138 and 140 extend beyond the end of the rod 134 and receive therebetween the eye 146 of an eyebolt 148 having a threaded portion 150 remote from the eye 146. A retaining pivot bolt 152 extends through the plates 138 and 140 and has washers 154 thereon for enabling pivotal movement of the hook-shaped member 132 in relation to the shank of the eyebolt 148 with the eye 146 of the eyebolt being generally cylindrical in configuration as illustrated in FIGURES 8 and 10.

Attached to the threaded end portion 150 of the eyebolt is an internally threaded cap-like nut 156 having a polygonal axial projection 158 on the closed end thereof for receiving a suitable wrench for rotation of the nut 156 which is threaded onto the threaded portion 150 of the eyebolt. The nut 156 includes a sleeve-like axial extension 160 on the end thereof opposite from the polygonal projection 158 which surrounds the shank of the eyebolt 148. The axial extension 160 includes a further axial extension 162 which is slightly less in cross-sectional configuration thus defining a shoulder 164. A retaining sleeve 166 is provided on the extension 162 and abuts the shoulder 164 and is retained in place by a suitable set-screw 168 thus defining a retainer for retaining the extension 160 through a bore 170 in a cylindrical eye member 172 on the end of an elongated bolt 174 which extends through the pylon or arm 44 as illusrtated in FIGURE 9. Disposed between the cylindrical eye 172 and the pylon 44 is a washer 176 and a retaining nut 178 and retaining washer 180 are provided on the bolt 174 and a reinforcing plate 182 may be provided on the inner surface of the pylon or arm 44 to enable rotation of the bolt 174 about the longitudinal axis of its shank thereby enabling the longitudinal axis of the shank of the eyebolt 148 to be varied. The engagement of the retaining collar 166 and its engagement with one side of the eye 172 on the bolt 174 and the engagement of the eye 172 with the nut 156 enables rotation of the assembled eyebolt 148 and nut 156 about the longitudinal axis of the shank of the eyebolt 148. However, when the eyebolt is prevented from turning, the nut 156 may be rotated to tighten the nut 156 thereby axially shifting the bolt 148 and hook member 132. The bolt 152 also serves as a pivot axis for the hook member 132 thereby enabling universal adjustment of the hook member so that it may be properly associated with the frame member 22 with loosening and tightening of the nut 156 enabling the lug or toe 142 and the corresponding portion of the hook-shaped member to be inserted through the opening 24 and then locked fixedly and rigidly but detachably in engagement therewith with the projecting lugs 42 telescoped into the sockets 26 provided therefor. Due to the line of action of the hook assembly, tightening of hook assembly also serves to force the pad 46 at the top of pylons 44 into engagement with the surface of the load unit thus eliminating use of fasteners at the upper ends of the pylons.

The connection between the transverse rigid member 40 and the frame members 22 through the sockets and projecting lugs combined with the connecting means 130 provides a rigid connecting assembly with the pivotal connection of the hook-like member to the upright arm or pylon enabling universal attachment of the running gear to the load carrying body. Other types of interconnections may be provided between the transverse member 40 and the frame members 22 but the connecting means 130 will effectively retain the interconnection therebetween in positive but detachable connecting engagement.

The rear running gear 36 and the freely swingable axle 52 enable the load carrying body and the running gears to traverse uneven terrain with less movement of the load carrying body and less strain on the load carrying body or shelter unit and the running gear by the provision of the articulate connection between the rear axle and transverse frame member.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A demountable running gear for a load carrying body comprising a rigid axle, means supporting the opposite ends of said axle from a supporting surface, a supporting frame including means attaching the frame to a load carrying body, and means connecting the frame to the axle adjacent the center thereof to enable relative pivotal movement about a longitudinal axis between the rigid axle and frame, said frame including a transverse member disposed alongside of said axle, said means pivotally connecting the frame and axle being disposed above the longitudinal axis of the axle and transverse member alongside thereof.

2. The structure defined in claim 1 wherein a transverse reinforcing member is provided on the upper surface of the axle, a transverse reinforcing member alongside thereof mounted on top of the transverse member forming part of the frame, said means connecting the frame and axle including a longitudinal member rigid with the transverse reinforcing member on the axle and pivotally engaging the reinforcing member on the frame.

3. The structure defined in claim 2 wherein said longitudinal member is in the form of a tubular member rigid with the transverse reinforcing member on the axle, said transverse reinforcing member on the frame including a bushing rotatably receiving said tubular member, a through bolt extending through the tubular member and engaging the transverse reinforcing members to retain them in assembled positions substantially in parallel vertical planes.

4. The structure as defined in claim 3 together with a pair of laterally spaced rub strips interposed between the axle and frame and between the transverse reinforcing members on the axle and frame for relieving horizontal bending moments on the connecting means between the frame and axle.

5. The structure as defined in claim 1 wherein said frame includes a pair of arms extending towards the load carrying body, said means connecting the frame to the load carrying body including upright pylons pivotally supported from the free ends of the arms, projecting lug means rigid with the pylons for engaging in sockets in the load carrying body, and a connecting member interconnecting each of the pylons and the load carrying body for retaining the pylons connected to the load carrying body.

6. A demountable running gear for a load carrying body comprising a rigid axle, means supporting the opposite ends of said axle from a supporting surface, a supporting frame including means attaching the frame to a load carrying body, and means connecting the frame to the axle adjacent center thereof to enable relative pivotal movement about a longitudinal axis between the rigid axle and frame, said frame including a pair of arms extending towards the load carrying body, said means connecting the frame to the load carrying body including upright pylons pivotally supported from the free ends of the arms, projecting lug means rigid with the pylons for engaging in sockets in the load carrying body, and a connecting member interconnecting each of the pylons and the load carrying body for retaining the pylons connected to the load carrying body, each connecting member including a hook member having an elongated shank portion and a laterally extending end portion adapted to extend through a transverse aperture in a frame member of the load carrying body, and means adjustably and swivelly connecting the shank portion of the hook member to the pylon for urging the pylons toward the surface of the load carrying body thereby eliminating the necessity of employing fasteners to connect the pylons to the body.

7. The structure as defined in claim 6 wherein said last-named means includes an eyebolt, said hook member being pivoted to one end of the eyebolt, a nut on the other end of the eyebolt, a supporting bolt extending through the pylon and having an eye member received on the shank of the eyebolt with the nut engaging one surface theerof to enable swivelling movement of the hook member about the axis of the shank of the eyebolt, adjustable movement of the shank of the eyebolt and swivel movement of the eyebolt about the axis of the mounting bolt.

8. The structure as defined in claim 4 wherein said frame includes a pair of arms extending toward the load carrying body, said means connecting the frame to the load carrying body including upright pylons pivotally supported from the free ends of the arms, projecting lug means rigid with the pylons for engaging in sockets in the load carrying body, and a connecting member interconnecting each of the pylons and the load carrying body for retaining the pylons connected to the load carrying body.

9. The structure as defined in claim 8 wherein each connecting means includes a hook member having an elongated shank portion and a laterally extending end portion adapted to extend through a transverse aperture in a frame member of the load carrying body, and means adjustably and swivelly connecting the shank portion of the hook member to the pylon, said last-named means including an eye-bolt, said hook member being pivoted to one end of the eye-bolt, a nut on the other end of the eye-bolt, a supported bolt extending through the pylon and having an eye member received on the shank of the eye-bolt with a nut engaging one surface thereof to enable swivelling movement of the hook member about the axis of the shank of the eye-bolt, adjustable movement of the shank of the eye-bolt, adjustable movement of the shank of the eye-bolt and swivel movement of the eye-bolt about the axis of the mounting bolt.

10. In a combined load carrying body and a demountable running gear therefor, said load carrying body including a frame member having transverse openings therein and longitudinally opening sockets, said demountable running gear having an upstanding pylon adapted to be disposed alongside of the end wall of the load carrying body and including projecting lugs telescoped into the sockets, means retaining the projecting lugs disposed in the sockets during elevational movement of the load carrying body, said connecting means including a hook-shaped member having an elongated shank portion and a transversely extending portion adapted to be disposed through the transverse openings in the load carrying body, means on the free end of the transversely extending portion for retaining the hook-shaped member assembled with the load carrying body, and means pivotally, swivelly, rotatably and adjustably mounting the other end of the hook member on a pylon whereby tension may be exerted on the hook-shaped member for urging the pylon towards the load carrying body for retaining the lugs on the pylon engaged with the sockets on the load carrying body.

11. The structure as defined in claim 10 wherein said means connecting the hook-shaped member to the pylon includes a mounting bolt extending through the pylon, said mounting bolt having a mounting ring on one end thereof, an adjusting and retaining nut rigidly disposed in said mounting ring, an eyebolt threaded into said retaining nut thus journalling the eyebolt in the ring for rotational movement of the eyebolt about the axis of the shank thereof, said eyebolt having an eye thereon, said hook-shaped member having a pair of plates underlying and overlying the eye of the eyebolt, and a pivot bolt extending through the plates and eye of the eyebolt to pivotally attach the hook-shaped member thereto thereby enabling pivotal movement of the hook-shaped member about the pivot bolt, swivelling movement thereof about the axis of the shank of the eyebolt, rotational movement about the shank of the mounting bolt and adjustment by tightening and loosening the retaining nut.

12. The structure as defined in claim 11 wherein said hook-shaped member includes an elongated L-shaped rod having upper and lower plates fastened thereto fixedly to reinforce the rod, said means on the free end of the transversely extending portion of the hook-shaped member being in the form of a lug projecting beyond the surface of the transverse portion of the hook-shaped member for hooking behind a portion of the load supporting body to retain the hook-shaped member assembled therewith.

13. The structure as defined in claim 12 wherein said running gear includes a second pylon spaced transversely of the first mentioned pylon, a rigid transverse member interconnecting said pylons, a pair of arms pivotally connected with said transverse member, means interconnecting said arms and pylons for varying the angular relationship therebetween, a transverse axle member rigidly attached to said arms, a rigid transverse axle extending alongside of said axle member, means pivotally interconnecting the transverse axle member and axle substantially at the central portion thereof for relative pivotal movement about an axis transverse of the axle member and axle, wheel means supported at the outer end of the transverse axle for supporting a load carrying body whereby variation in the angular position between the pylons and arms will serve to raise and lower the load carrying body.

14. The structure as defined in claim 13 wherein said pivotal connection between the transverse axle member and the axle is disposed above the axle member and axle and includes vertically disposed bearing surfaces disposed between the axle member and axle and to stabilize the axle member and axle during relative pivotal movement about the axis of pivotal connection therebetween.

References Cited

UNITED STATES PATENTS

| | | | |
|---|---|---|---|
| 2,560,144 | 7/1951 | Voorhees | 280—111 |
| 2,604,194 | 7/1952 | Hammitt et al. | 189—35 |
| 2,968,490 | 1/1961 | Baus | 280—35 |
| 3,154,164 | 10/1964 | Shaw et al. | 280—111 |
| 3,243,193 | 3/1966 | Fulmer et al. | 280—35 |
| 2,820,644 | 1/1958 | Smith | 280—111 X |

KENNETH H. BETTS, Primary Examiner

U.S. Cl. X.R.

280—43.23, 111